(12) United States Patent
Crowe

(10) Patent No.: US 10,076,211 B1
(45) Date of Patent: Sep. 18, 2018

(54) SAUSAGE COOKWARE

(71) Applicant: Ryan Crowe, Southlake, TX (US)

(72) Inventor: Ryan Crowe, Southlake, TX (US)

(*) Notice: Subject to any disclaimer, the term of this patent is extended or adjusted under 35 U.S.C. 154(b) by 168 days.

(21) Appl. No.: 14/627,007

(22) Filed: Feb. 20, 2015

(51) Int. Cl.
  *A47J 37/07* (2006.01)
  *A47J 37/10* (2006.01)

(52) U.S. Cl.
  CPC ............ *A47J 37/10* (2013.01); *A47J 37/108* (2013.01)

(58) Field of Classification Search
  CPC .. A47J 27/00; A47J 27/58; A47J 37/00; A47J 37/06
  USPC .. 99/340, 400, 482, 444–450, 422–425, 481
  See application file for complete search history.

(56) References Cited

U.S. PATENT DOCUMENTS

| | | | |
|---|---|---|---|
| 6,269,738 B1* | 8/2001 | Huang | A47J 37/0611 99/372 |
| 6,782,801 B1* | 8/2004 | Correa | A47J 37/067 99/340 |
| 2006/0075906 A1* | 4/2006 | Tseng | A47J 37/048 99/422 |
| 2012/0055346 A1* | 3/2012 | Navare | A47J 37/10 99/445 |

* cited by examiner

*Primary Examiner* — Phuong Nguyen
(74) *Attorney, Agent, or Firm* — Kenneth L. Tolar

(57) ABSTRACT

Sausage cookware includes a hollow pan having a cooking surface with multiple undulations that partially conform to the outer circumference of a link sausage. Other embodiments include an insert for converting the flat cooking surface of a conventional frying pan or electric cooker to an undulated surface that more efficiently cooks link sausages.

6 Claims, 3 Drawing Sheets

SAUSAGE COOKWARE

CROSS REFERENCE TO RELATED APPLICATIONS

None.

BACKGROUND OF THE INVENTION

The present invention relates to cookware that increases the contact area between a cooking surface and a link sausage for more uniform cooking and heat distribution.

DESCRIPTION OF THE PRIOR ART

When cooking link sausages in a conventional frying pan, a chef must repeatedly rotate the sausages to uniformly sear the exterior. If the chef is distracted even for a short period of time, a portion of the sausage may be overcooked and the sausage must be discarded. Constantly turning sausages is laborious and annoying.

Accordingly, there is currently a need for a device that allows a user to more easily and thoroughly cook link sausages. The present invention addresses this need by providing a frying pan having a plurality of undulations on a cooking surface that partially encompass a sausage link to cook a larger surface area.

SUMMARY OF THE INVENTION

The present invention relates to sausage cookware comprising a hollow pan having a cooking surface with multiple undulations that partially conform to the outer circumference of a link sausage. Other embodiments include an insert for converting the flat cooking surface of a conventional frying pan or electric cooker to an undulated surface that more efficiently cooks link sausages.

It is therefore an object of the present invention to provide cookware that more efficiently sears link sausages.

It is another object of the present invention to provide cookware having cradles formed on a cooking surface for more efficiently searing a link sausage.

It is yet another object of the present invention to provide an insert for converting the conventional, planar cooking surface of a conventional frying pan or electric cooker to an undulated surface that more efficiently cooks link sausages.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
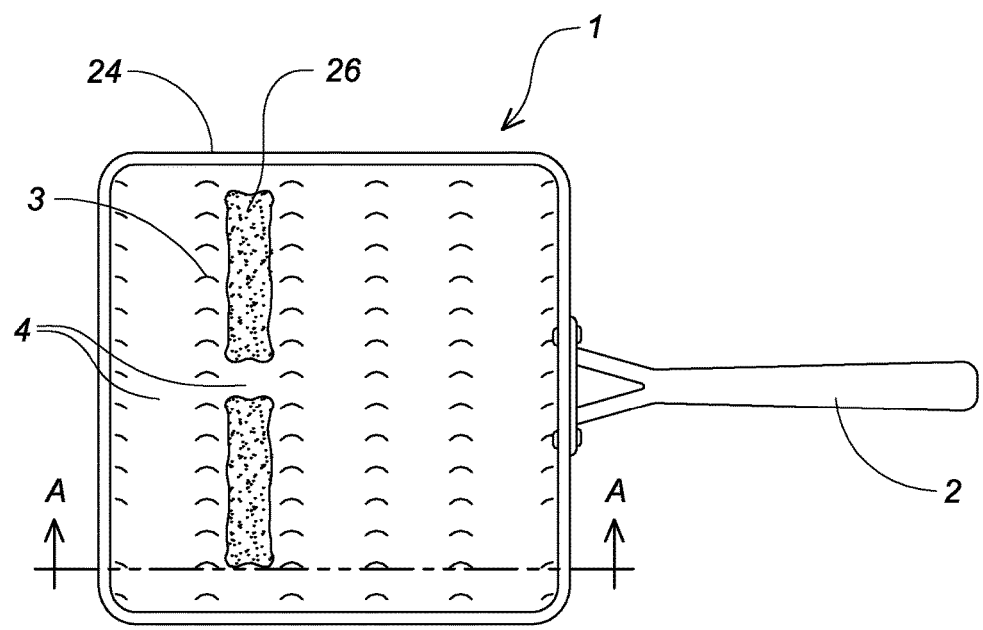
FIG. 1 is a top, plan view of a first embodiment of the cookware according to the present invention.
Figure 2:
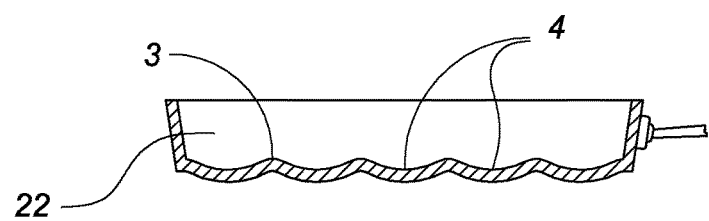
FIG. 2 is a sectional view of the cookware taken along A-A of FIG. 1.
Figure 3:
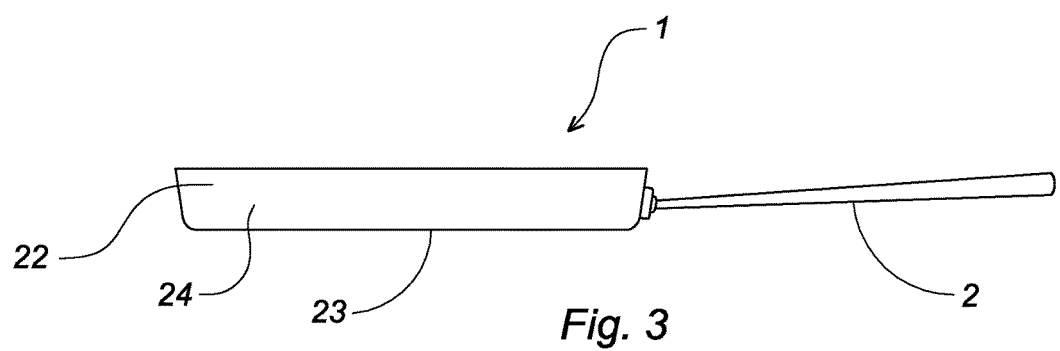
FIG. 3 is a side view of the pan of FIG. 1.
Figure 4:
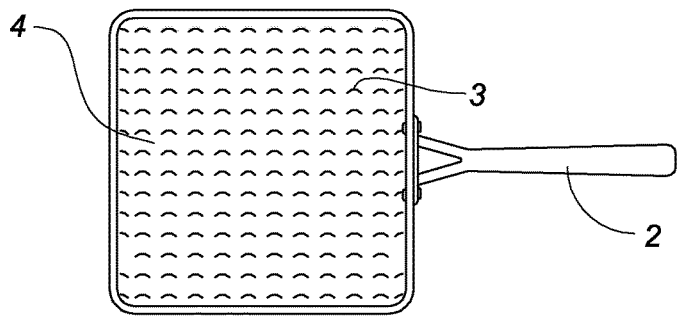
FIG. 4 is a top view of a second embodiment of cookware.

The present invention relates to cookware having a cooking surface that more efficiently cooks link sausages. Referring specifically to FIGS. 1-4, a first embodiment 1 includes a hollow pan 22 having a bottom surface 23 with a plurality of peripheral sidewalls 24 vertically extending therefrom. Horizontally extending from one of the sidewalls is an elongated handle 2. An interior side of the bottom wall forms a cooking surface having a non-stick coating applied thereto. The cooking surface includes a plurality of undulations that form a plurality of crests 3 with arcuate sausage cradles 4 therebetween for receiving link sausages 26. Each cradle is dimensioned and configured to conform to a substantial portion of the outer circumference of a link sausage to minimize turning. As depicted in FIG. 4, the distance between adjacent crests can be modified to accommodate varying-width sausages.

Figure 5:
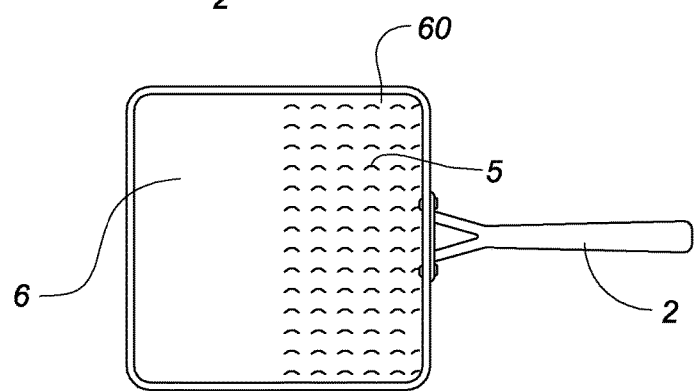
FIG. 5 is a top view of a third embodiment of cookware.

Now referring to FIG. 5, another embodiment includes a cooking surface having a plurality of undulations 5 as described above formed on a first section 60 and a segregated smooth, planar zone 6 adjacent thereto. Accordingly, a user can simultaneously cook sausages in the first section 60, and eggs, patty sausages or other food items in the planar zone.

Figure 6A:
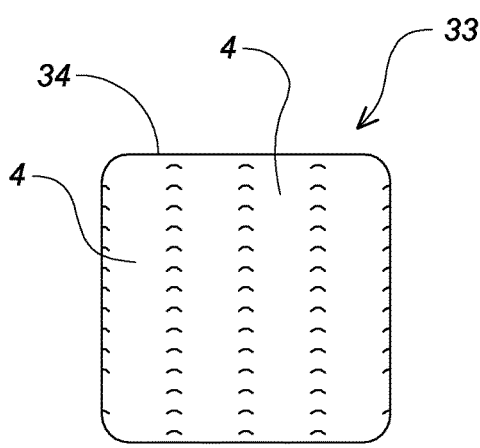
FIGS. 6A and 6B are top views of a fourth embodiment of cookware.
Figure 6B:
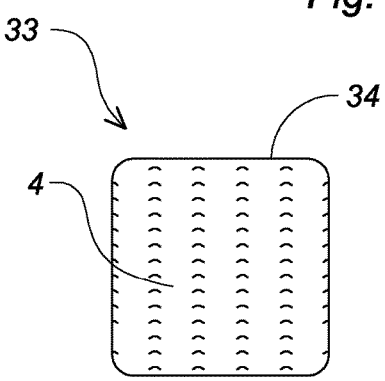

Depicted in FIGS. 6A and 6B are additional embodiments 33 designed to convert the flat cooking surface of a conventional frying pan or electric cooker to an undulated surface that more efficiently cooks link sausages. Each embodiment includes a sheet 34 that is dimensioned and configured to firmly fit within a conventional frying pan or an electric cooker. The upper surface of the insert includes undulations that form sausage cradles 4 as described above for conforming to larger (FIG. 6A) or smaller (FIG. 6B) sausages.

Figure 7:
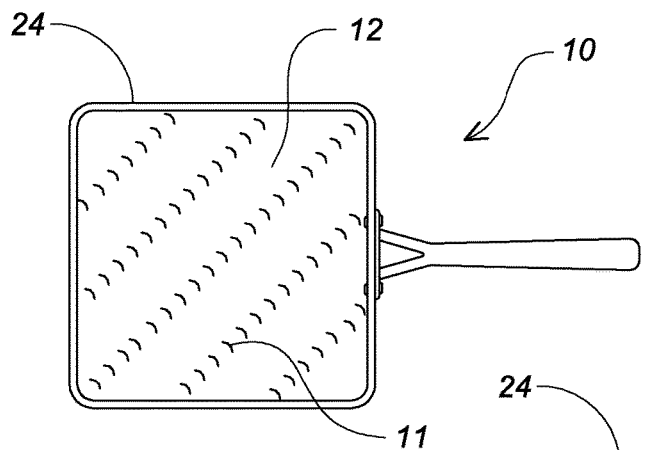
FIG. 7 is a top view of a fifth embodiment of cookware.
Figure 8:
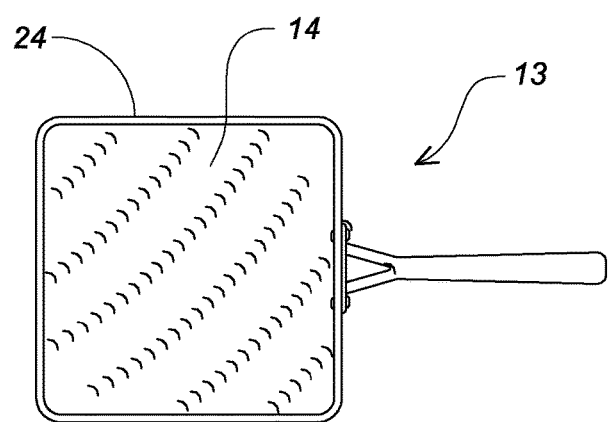
FIG. 8 is a top view of a sixth embodiment of cookware.

Referring to FIG. 7, yet another embodiment 10 includes undulations whereby the crests 11 and interposed cradles 12 extend diagonally or obliquely relative to the sidewalls 24 to accommodate wider and/or longer sausage links. Alternatively, with the embodiment 13 of FIG. 8, the cradles 14 can form a curved path from one sidewall to another to more easily accommodate bratwurst and other arcuate, gourmet sausages.

Figure 9:
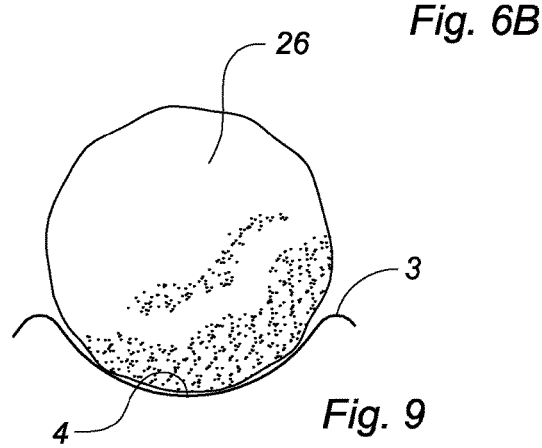
FIG. 9 is a sectional view of an exemplary sausage cradle according to the embodiments depicted in FIGS. 1-8.
Figure 10:
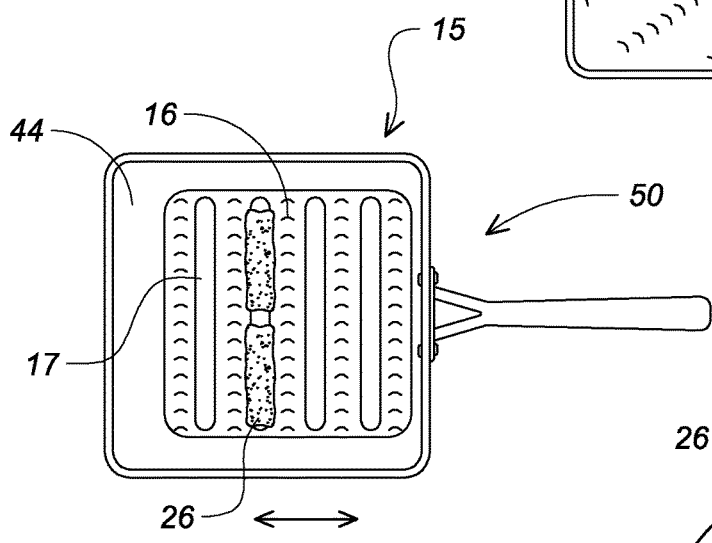
FIG. 10 is a top view of a seventh embodiment of cookware.

Finally, FIGS. 9 and 10 depict yet another embodiment including a sheet 15 that is somewhat smaller than the cooking surface 44 of a conventional frying pan 50 so that it can be manually slid therein at least in either of two directions. The sheet includes an upper surface having a plurality of undulations formed 16 thereon that form cradles for link sausages. Centrally positioned within each cradle is an elongated slot 17 that allows the sausage to contact the pan's cooking surface 44 when received therein. Accordingly, when a user slides the insert within the conventional frying pan 50, the sausage rotates so that another portion of the sausage engages the cooking surface 44.

Figure 11:
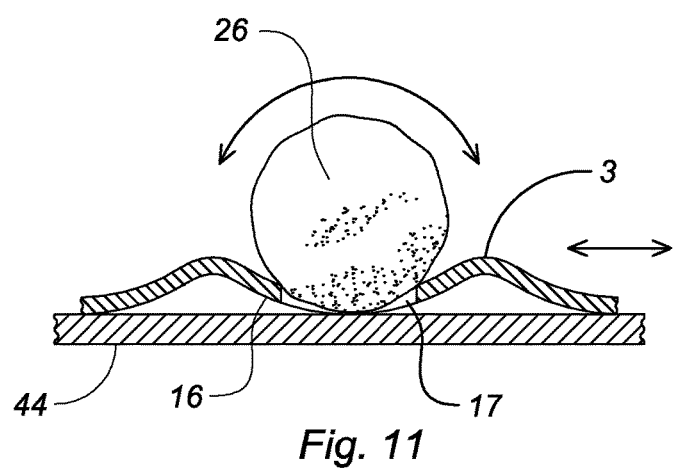
FIG. 11 is a sectional view of the embodiment depicted in FIG. 9.

The above-described device is not limited to the exact details of construction and enumeration of parts provided herein. For example, the curvature of the cradles can be varied to encompass a larger portion of the sausage circumference as depicted in FIG. 9, or a smaller portion as depicted in FIG. 11. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A sausage cookware utensil comprising:
    a sheet that forms a first cooking surface when placed upon a heat source, said sheet having an upper surface and a lower surface;
    a plurality of undulations on the upper surface of said sheet, said undulations forming a plurality of spaced crests with arcuate sausage cradles therebetween, each of said cradles configured to engage and to partially conform to an outer circumference of a link sausage to decrease cooking time and to assure uniform searing;
    wherein each of said cradles includes an elongated slot centrally positioned therein that allows the link sausage to contact a second cooking surface beneath said sheet.

2. The sausage cookware utensil according to claim 1 wherein said first cooking surface includes a plurality of peripheral sidewalls, one of said sidewalls having a handle horizontally extending therefrom to form a frying pan.

3. The sausage cookware utensil cookware according to claim 2 wherein said cradles extend obliquely relative to said sidewalls to accommodate wide and long sausage links.

4. The sausage cookware utensil cookware according to claim 2 wherein said cradles form a curved path from one of said sidewalls to another of said sidewalls to more easily accommodate arcuate, gourmet sausages.

5. The sausage cookware utensil cookware according to claim 1 wherein said sheet is dimensioned to be slidable within a frying pan so that when said sheet laterally slid, another portion of said link sausage is rotated into engagement with said second cooking surface.

6. The sausage cookware utensil cookware according to claim 1 wherein said first cooking surface includes a smooth, planar zone adjacent to and segregated from said undulations for simultaneously cooking food items other than link sausages.

* * * * *